Oct. 9, 1928.  N. D. LEVIN  1,686,567

MATERIAL CARRYING FLIGHT

Filed April 24, 1925  2 Sheets-Sheet 1

Oct. 9, 1928.

N. D. LEVIN 1,686,567

MATERIAL CARRYING FLIGHT

Filed April 24, 1925  2 Sheets-Sheet 2

Patented Oct. 9, 1928.

1,686,567

UNITED STATES PATENT OFFICE.

NILS D. LEVIN, OF COLUMBUS, OHIO, ASSIGNOR TO THE JEFFREY MANUFACTURING COMPANY, OF COLUMBUS, OHIO, A CORPORATION OF OHIO.

MATERIAL-CARRYING FLIGHT.

Application filed April 24, 1925. Serial No. 25,610.

The present invention relates to certain new and useful improvements in material carrying flights, such as are used in conveyors of the scraper type.

The object of the invention is to provide a conveying flight adapted to project laterally from a single strand of conveyor chain, which flight will be held rigidly against both longitudinal and angular movement relative to said chain in position to engage and propel loose material along the conveyor trough, and which may be freely swung in planes extending transversely of the chain as and for the purposes hereinafter set forth.

In one embodiment of the invention disclosed, the flight is so formed as to prevent, or at least minimize, the danger of the flights catching on any protuberances, such as joints in the conveyor trough, and breaking.

The means whereby I attain this object are fully set forth in the following specification and illustrated in the accompanying drawings, of which—

Like numerals refer to similar parts in the several figures.

Figure 1:
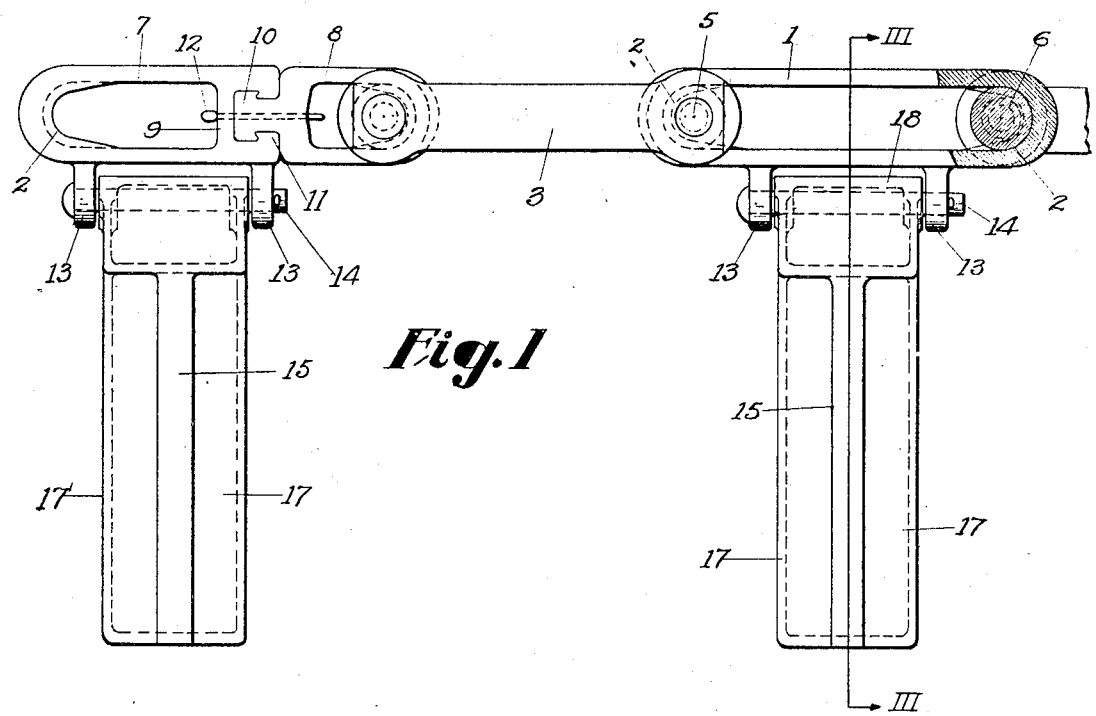
Fig. 1 is a plan view, partly in section, of a chain embodying my invention, with conveyor elements attached.

In my copending application, Serial No. 721,871, filed June 23, 1924, of which this present application is a continuation in part. I have shown my improved chain and carrying flight comprising a series of alternate strap and bar links which are so articulated as to permit universal flexure of the chain within limit sufficient to take care of the usual conditions under which it is used.

The strap links consist of flattened endless loops 1, preferably formed of metallic bar stock of substantially rectangular cross-section, but, if desired, they may be formed of castings or drop forgings having elongated apertures extending longitudinally of the links, and at each end there is formed a bearing seat 2 of spherical curvature.

Each bar link is formed of a pair of parallel side bars 3 having, at the ends, inwardly projecting conical bosses 4, to give the proper thickness of metal for the pintles presently to be described. The bosses 4 are pierced by suitable apertures, into which pintles 5 are secured in any suitable manner, being here shown as riveted. Between the bosses 4, the pintles 5 are provided with the spherical bodies 6 which engage the bearing seats 2 of the adjacent link, and these parts are of such proportions as to permit universal relative angular movement of adjacent links.

Figure 2:
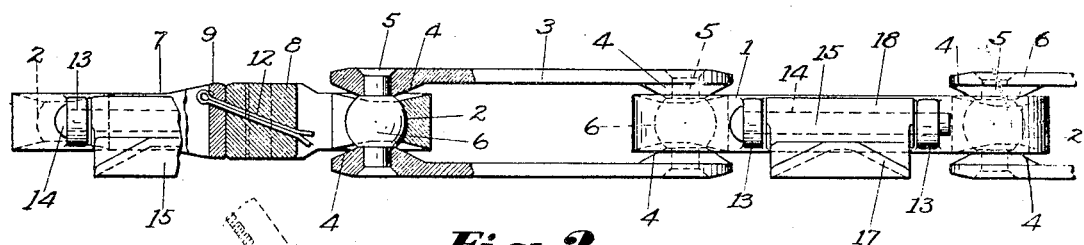
Fig. 2 is a side elevation, partly in section, of the chain illustrated in Fig. 1, showing, in end elevation, the conveyor elements.
Figure 3:
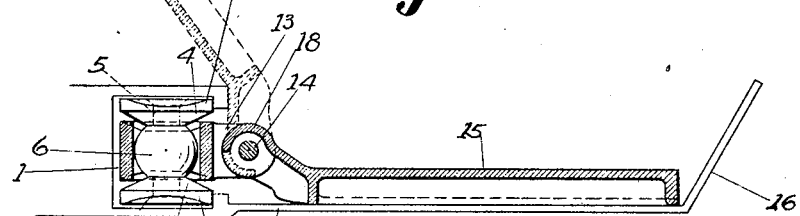
Fig. 3 is a section taken along the line III—III of Fig. 1, showing the chain and, in section, the conveying elements, these parts being shown in their relation to the conveyor trough.

The spherical portions 6 of the pintles 5, which are engaged by the seats 2 of links 1, permit universal movement of the links relative to one another. It will be seen that the coned portions 4 at the ends of links 3, which give the requisite strength for supporting the pintles 5, are opposed by complementary recesses formed in the side faces of the links 1, so that a sufficient clearance is provided to permit rocking of the links relative to each other upon the spherical end bearings. Reference to Figs. 2 and 3 of the drawings shows that the conical portions 4 and the opposed complementary recesses are not in contact, but merely give clearance for free link movement in any direction.

To connect the ends of the chain together, I have provided a coupling link 7 which is formed of the parts 8 and 9, each having an end bearing seat 2, similar to the seats formed in the links 1, adapted to engage the pintle 5 of the adjacent bar link. Formed on the end of the part 8 is one member of an interlocking connection, here shown as a transversely extending dove tail projection adapted to engage an interlocking member on the part 9, here shown as a socket 11. A cotter pin 12 is inserted in aligned apertures of the parts 9 and 10, when said parts are in engaged position, thereby preventing accidental disengagement of said parts. Said cotter pin 12 is positioned entirely within the bounding planes of the link 7, thereby protecting from accidental contact with external objects.

While I have described and shown a conveyor chain of peculiar construction, it is to be understood that any other type of chain suitable to the purposes of this invention may be substituted for that here illustrated without departure from the spirit of my invention.

The strap links 1 are provided, as here shown, with two laterally projecting lugs 13, a pivot pin 14 being removably mounted therein, upon which pin is mounted the laterally projecting conveyor flight 15. By this means the flights 15 are securely held against both angular and bodily movements longitudinally of the chain, but are free to swing about the pivot pins 14 in planes extending transversely thereof. For example, as shown in dotted lines in Fig. 3, the flight 15 may be thrown, either manually or by mechanical means, to an idle position, and, due to its construction and mounting, will remain in such tilted position until again thrown to working position, as shown in full lines.

I have shown, in the drawings, a carrier flight adapted to slip beneath loose material and carry it into and along the conveyor, it being here shown in connection with a conventionally illustrated trough 16, and while other forms of conveyor flights adapted to propel material may be substituted for that here illustrated, I have found the particular flights shown to possess marked advantages with certain classes of material. The said flight 15 is formed hollow, as shown, for lightness, and an inclined portion 17, preferably, on each side of the longitudinal center of the flight, so as to be effective in either direction of movement of the chain. This gives a flight of sufficient height and of shovel-like formation to engage and carry along loose material, such as coal, without sliding idly beneath it, and yet it will pass under without stalling or breaking, any body too heavy to be moved. In practice, masses of loose material will accumulate between the opposed incline 17 of adjacent flights and be carried along en masse.

The rear or attaching end 18 of the flight 15 is preferably thrown up at an angle to meet the center line of the chain, as shown, while permitting the body of the flight to be flat upon the ground. Such angularly disposed end also permits the overthrow of the body 15 when the flight is thrown to the dotted line position shown in Fig. 3.

In order to protect the pivot bolt 14 and prevent jamming or clogging the pivotal action of the flight, the attaching end 18 is carried over or curved about the pivot member 14 (see Fig. 3) to house and protect it.

Figure 4:
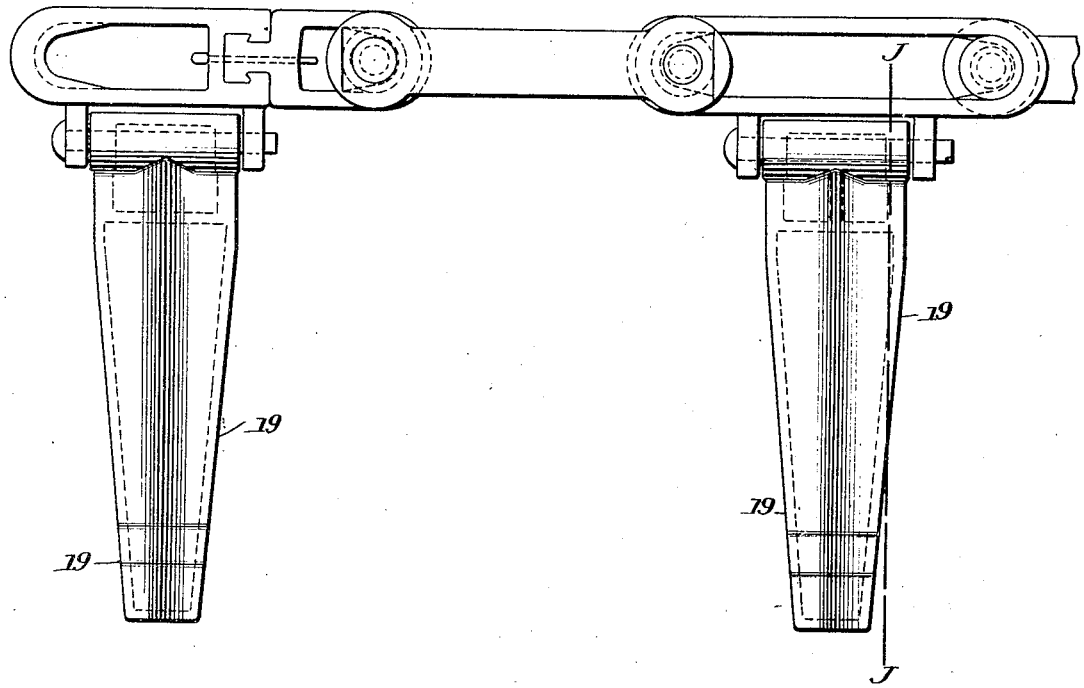
Fig. 4 is a view similar to Fig. 1, showing a different form of flight.
Figure 5:
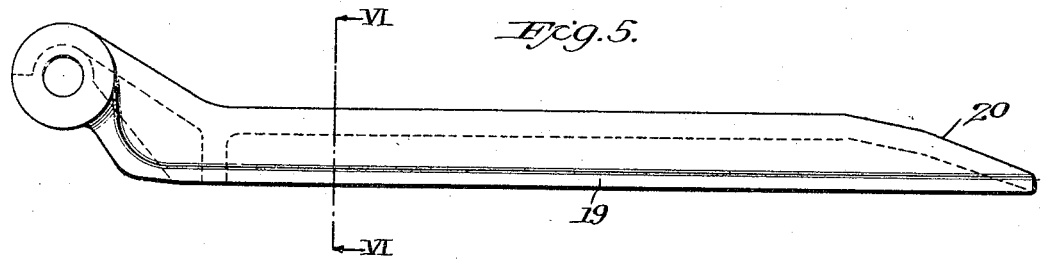
Fig. 5 is a detail view in side elevation of the flight shown in Fig. 4.
Figure 6:
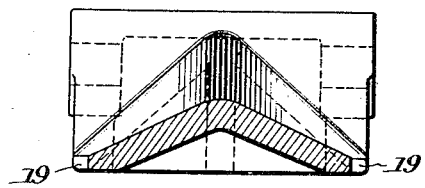
Fig. 6 is a sectional view substantially on the line VI—VI of Fig. 4.

Referring to the flight illustrated in Figs. 4, 5 and 6, it will be observed that the longitudinal edges 19 of the flight are inclined toward each other, so as to give a wedge-like formation, and the nose 20 of the flight is flattened or inclined downwardly. By inclining the edges 19, as shown, the flights will ride over protuberances, such as are sometimes present at the joints in the conveyor trough, and danger of the flight catching and breaking is eliminated. In Fig. 4 the line of a joint is indicated by the dotted line J—J, and it will be seen that as the flight approaches this joint, the inclined edge 19 will permit the flight to ride gradually over the joint, lifting it upon its pivot, so as to clear any projection.

The inclined or flattened nose 20 of the flight permits the extreme end of the flight to slide readily beneath any large masses of material, and so relieves the flight from any breaking strains at its extreme tip.

With a flight constructed as shown in Figs. 4, 5 and 6, breakage is substantially eliminated by reason of the provision of the means described for relieving the flights from any breaking strains due to protuberances with which the flights may come in contact, or from breaking strains at the extreme tip of the flight due to engaging large masses of material.

While I have shown the edges 19 inclined inwardly from the base to the tip, and this is preferable, the inclination might be reversed and be inwardly from the tip to the base with the same beneficial results.

It is to be understood, however, that the parts above described may be subject to wide variation in structure without departing from the spirit of my invention.

From the foregoing disclosure, it will be seen that I have provided a material carrying flight which can be universally used on conveyor chains of the type shown and specified.

This construction gives an extremely useful flight, particularly when used with a conveyor chain of this type, having universal movement of the links by reason of the articulation shown and described, insures the flights adapting themselves to the inaccuracies of the surface over which they travel, and to more effectively handle material, that is, picking up and carrying proper loads without clogging or breaking when striking unusual objects.

Such changes as involve mechanical skill or the adoption of mechanical expedients equivalent of those herein disclosed, are to be regarded as within the purview of my invention.

What I claim is:—

1. In a conveyor of the class described, the combination of a chain link, a pivot member carried by said link and extending longitudinally thereof, and a conveyor flight pivoted to said member, said flight having a plurality of bearing points and a housing intermediate said points extending over said pivot member.

2. In a conveyor chain, the combination of a chain link, a pivot member carried by said link and extending longitudinally thereof, a conveyor flight pivoted to said member, the bearing portion of said flight being above the horizontal bottom plane of the flight when the flight is in working position whereby said bottom plane is adapted to lie substantially in the bottom plane of the chain, said bearing portion being disposed to permit the flight to swing across the link to idle position.

3. In a conveyor chain, the combination of a chain link, a pivot member carried by said link and extending longitudinally thereof, a conveyor flight pivoted to said member, said flight having a plurality of bearing points and a housing intermediate said points extending over said pivot member, the bearing portion of said flight being above the horizontal bottom plane of the flight when the flight is in working position whereby said bottom plane is adapted to lie substantially in the bottom plane of the chain, said bearing portion being disposed to permit the flight to swing across the link to idle position.

4. In a conveyor of the class described, the combination of a chain link having spaced laterally extending lugs thereon, a pivot member extending between said lugs and carried by the latter, a conveyor flight pivoted to said member, said flight having a bearing point adjacent each of said lugs and a housing intermediate said points extending over said pivot member.

5. In a conveyor of the class described, the combination of a chain link, a pivot member carried by said link and extending longitudinally thereof, and a flight of substantially V shape in cross-section, the walls of said flight merging into bearing lugs for pivotally engaging said pivot member.

6. In a conveyor of the class described, the combination of a chain link, a pivot member carried by said link and extending longitudinally thereof, a flight of substantially V shape in cross-section, the walls of said flight merging into bearing lugs for pivotally engaging said pivot member, and a housing intermediate said lugs and extending over said pivot member.

In testimony whereof I have hereunto set my hand.

NILS D. LEVIN.